United States Patent
Lu

(10) Patent No.: US 8,101,294 B2
(45) Date of Patent: Jan. 24, 2012

(54) BATTERY HOLDING STRUCTURE

(75) Inventor: Pen-Uei Lu, Tu-Cheng (TW)

(73) Assignee: Chi Mei Communication Systems, Inc., Tu-Cheng, New Taipei (TW)

( * ) Notice: Subject to any disclaimer, the term of this patent is extended or adjusted under 35 U.S.C. 154(b) by 329 days.

(21) Appl. No.: 12/469,796

(22) Filed: May 21, 2009

(65) Prior Publication Data
US 2010/0136397 A1 Jun. 3, 2010

(30) Foreign Application Priority Data
Nov. 28, 2008 (CN) .......................... 2008 1 0305854

(51) Int. Cl.
*H01M 2/10* (2006.01)
(52) U.S. Cl. ....................................................... 429/100
(58) Field of Classification Search ................ 429/96, 429/97, 100; 361/747, 801, 802, 803, 679.01, 361/679.02, 679.58, 600; 292/345, 292; 439/136, 152, 153, 157, 159, 160
See application file for complete search history.

(56) References Cited

U.S. PATENT DOCUMENTS

| | | | | |
|---|---|---|---|---|
| 4,659,159 A | * | 4/1987 | Takahashi | 439/345 |
| 5,321,580 A | * | 6/1994 | Hosoi et al. | 361/679.41 |
| 6,102,721 A | * | 8/2000 | Seto et al. | 439/160 |
| 6,583,600 B2 | * | 6/2003 | Haga et al. | 320/110 |
| 7,095,607 B2 | * | 8/2006 | Imamura | 361/679.57 |
| 7,220,152 B2 | * | 5/2007 | Jeong | 439/862 |
| 2002/0034683 A1 | * | 3/2002 | Takeshita et al. | 429/123 |

OTHER PUBLICATIONS

Dell Inspiron 6400/E1505 Service/User Manual Feb. 2006, Battey Latch Assembly.*

* cited by examiner

*Primary Examiner* — Jerry Lorengo
*Assistant Examiner* — Carlos Barcena
(74) *Attorney, Agent, or Firm* — Altis Law Group, Inc.

(57) ABSTRACT

A battery holding structure includes a battery receptacle, a receiving chamber, and a locking member. The battery is received in the battery receptacle, and the receiving chamber communicates with the battery receptacle. The locking member is received in the receiving chamber for locking the battery. The battery receptacle includes a base wall, and the battery holding structure also includes a push member. The push member is connected to the base wall elastically, and the push member can create a force to resisting the battery away from the battery receptacle.

12 Claims, 4 Drawing Sheets

BATTERY HOLDING STRUCTURE

BACKGROUND

1. Technical Field

The present disclosure generally relates to battery holding structures, particularly, to a battery holding structure used in a portable electronic device.

2. Description of Related Art

Portable electronic devices such as mobile phones and personal digital assistants (PDAs) are widely used. Changeable batteries are installed in most portable electronic devices to supply electric power. When a battery is installed in a portable electronic device, it is generally fixed in place by a battery holding structure, thus the battery and the inner circuits of the portable electronic device are protected.

A typical battery holding structure has a battery receiving slot, an elastic member and a coupling member for installation or removal of the battery. One end of the coupling member resists the base surface of the battery. The elastic member can create an elastic force to make the coupling member rotate, thus the end of the coupling member can push the battery out of the battery receiving slot.

However, in the process of removing the battery from the battery receiving slot, a large sliding friction is generated between the coupling member and the battery. Over time, the coupling member and the base surface of the battery become abraded due to friction. Therefore, both the battery and the battery holding structure have a relatively short service life.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout several views, and all the views are schematic.

DETAILED DESCRIPTION

Figure 1:
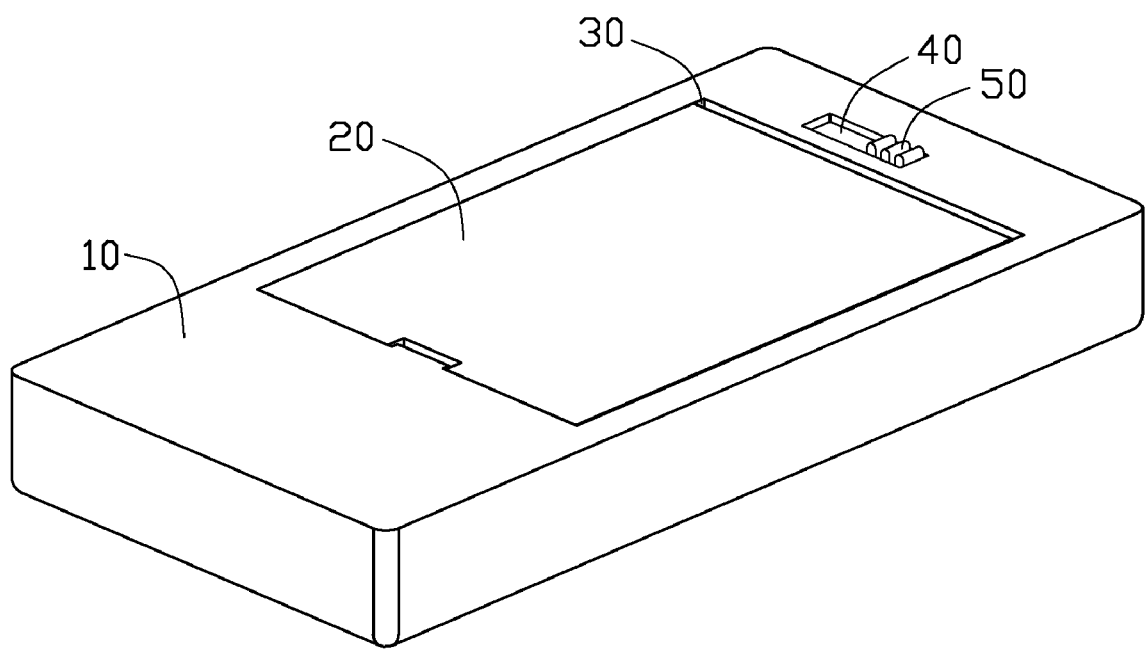
FIG. 1 is an assembled, isometric view of an embodiment of a battery holding structure, the battery holding structure being shown attached to a portable electronic device.

The present battery holding structure may be used in portable devices, such as mobile phones, personal digital assistants, etc. Referring to FIG. 1, an embodiment of the portable electronic device 10 is described and illustrated as a mobile phone.

Figure 2:
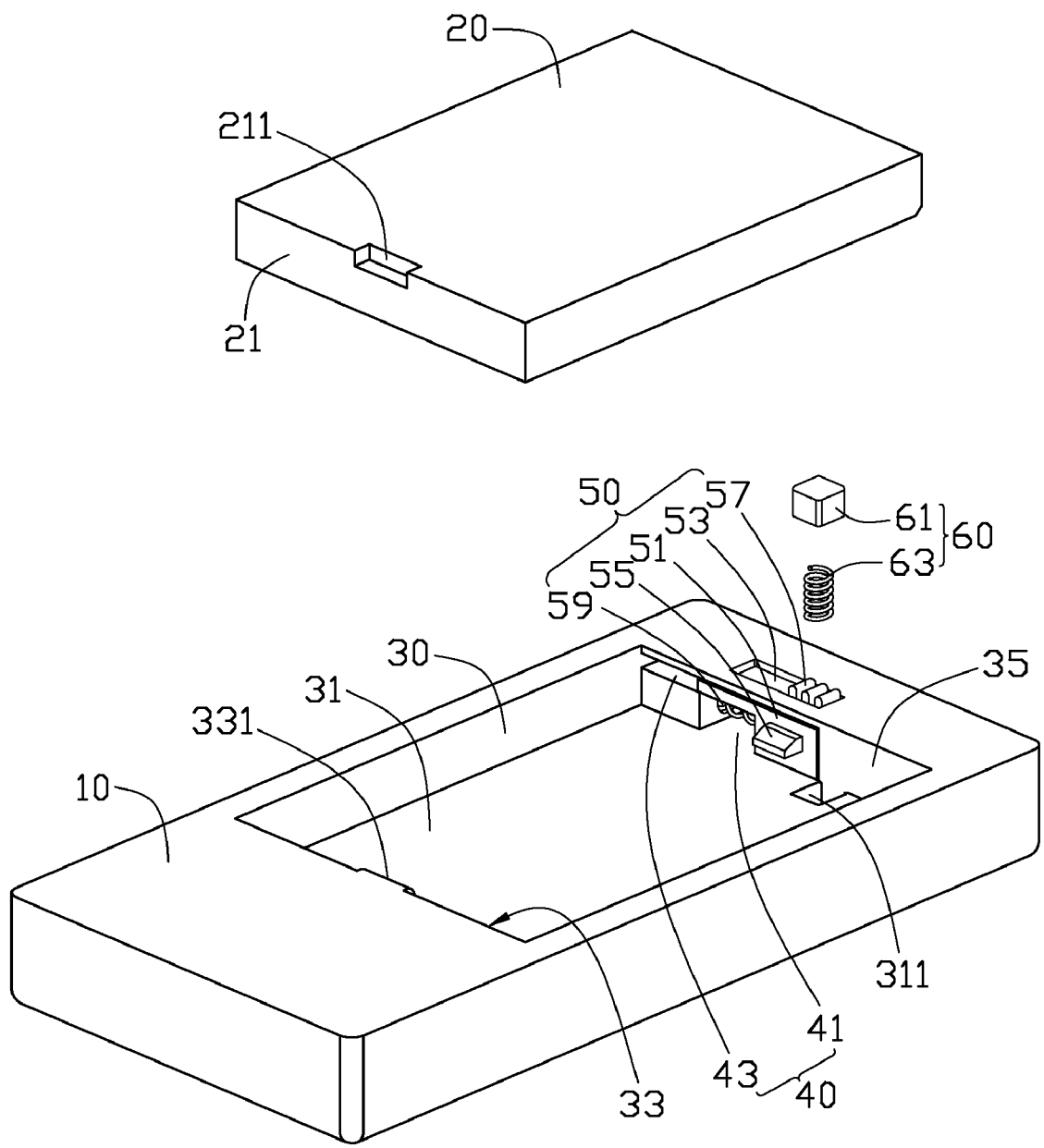
FIG. 2 is an exploded, isometric view of the portable electronic device of FIG. 1.

Referring to FIG. 1 and FIG. 2, the portable electronic device 10 includes a battery 20, a battery receptacle 30, a receiving chamber 40, a locking member 50, and a pushing member 60. The battery 20 and the pushing member 60 are received in the battery receptacle 30. The locking member 50 is received in the receiving chamber 40, and part of the locking member 50 protrudes into the battery receptacle 30.

Figure 3:
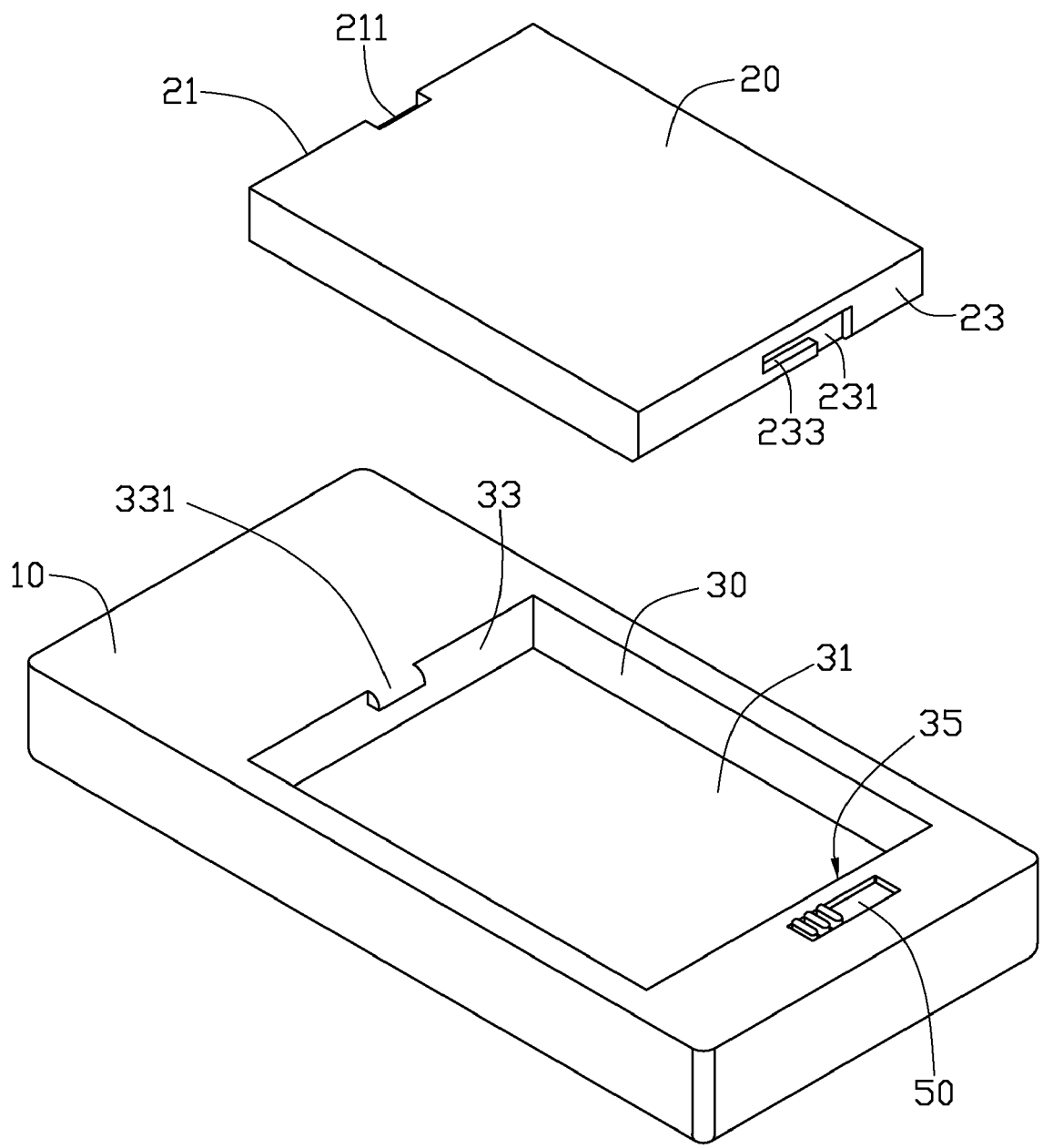
FIG. 3 is an exploded, isometric view of the portable electronic device of FIG. 1 viewed from another aspect.

Referring to FIG. 2 and FIG. 3, the battery 20 includes a first surface 21 and a second surface 23 opposite to the first surface 21. A first locking slot 211 is defined in the first surface 21 of the battery 20. A second locking slot 231 and a third locking slot 233 are defined in the second surface 23 of the battery 20. The second locking slot 231 communicates with the third locking slot 233.

The battery receptacle 30 includes a base wall 31, a first sidewall 33 and a second sidewall 35 opposite to the first sidewall 33. The first sidewall 33 and the second sidewall 35 are perpendicular to the base wall 31. A blind mounting slot 311 is defined in the base wall 31. A locking portion 331 protrudes from the first sidewall 33 into the battery receptacle 30, and the locking portion 331 engages with the first locking slot 211 of the battery 20.

The receiving chamber 40 includes a first receiving slot 41 and a second receiving slot 43. The first receiving slot 41 communicates with the battery receptacle 30 and the second receiving slot 43.

Figure 4:
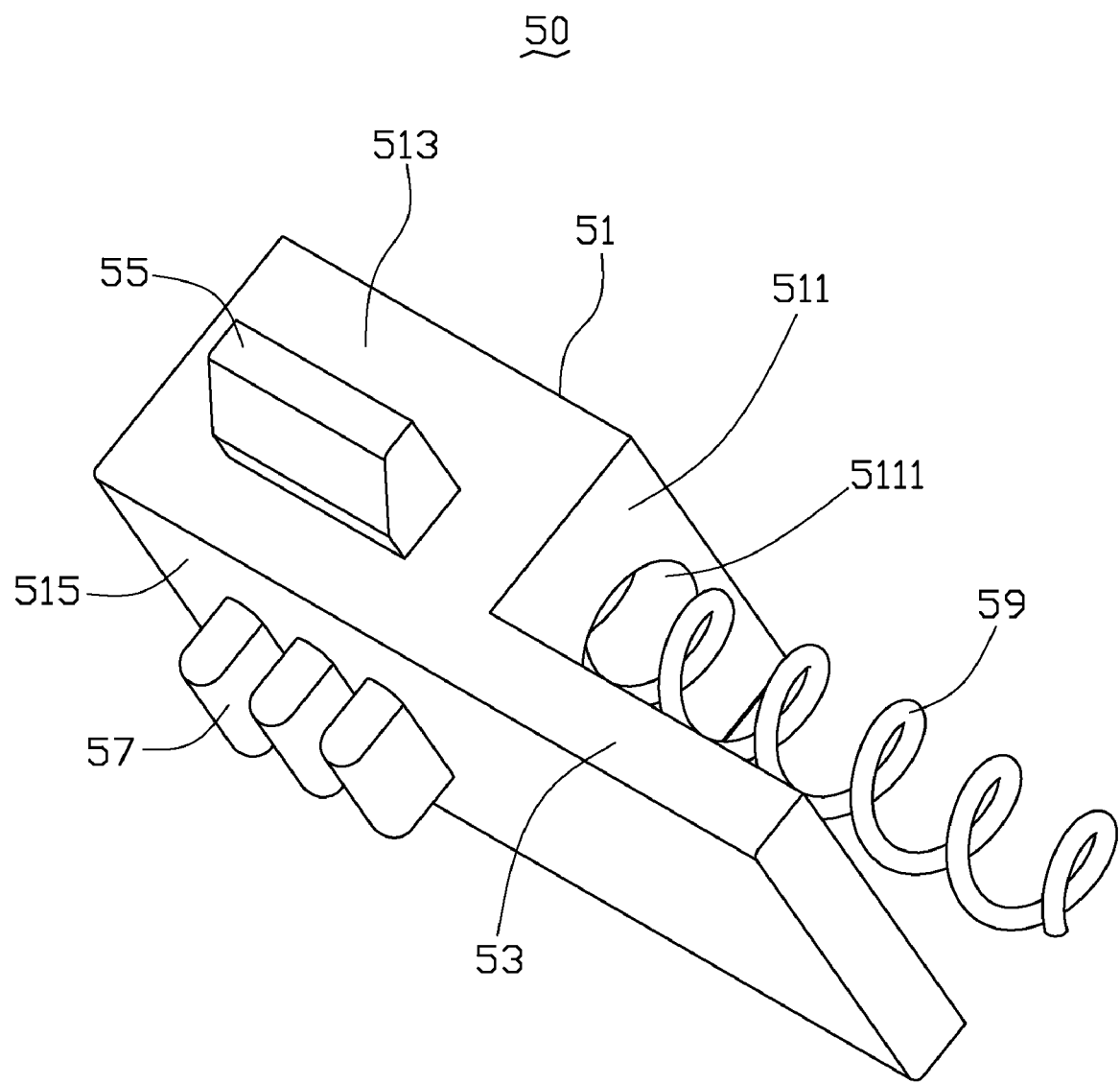
FIG. 4 is an assembled, isometric view of a locking member of the battery holding structure of FIG. 1.

Referring to FIG. 2 and FIG. 4, the locking member 50 includes a main body 51, a guiding plate 53, a resisting portion 55, a switch portion 57, and a first resilient member 59. The main body 51 includes a first surface 511, a second surface 513, and a third surface 515 perpendicular to each other. A blind mounting hole 5111 is defined from the first surface 511 of the main body 51. The guiding plate 53 is formed on the first surface 511. The resisting portion 55 is formed on the second surface 513 and extends into the battery receptacle 30. The switch portion 57 protrudes from the third surface 515 and extends to the outside of the portable electronic device 10. One end of the first resilient member 59 is fixed in the blind mounting hole 5111 of the main body 51, and the other end of the resilient member 59 is fixed in the first receiving slot 41. In the illustrated embodiment, the first resilient member 59 is a helical, compression spring.

The pushing member 60 includes a pushing portion 61 and a second resilient member 63. The pushing member 60 is partially received in the blind mounting slot 311 of the battery receptacle 30. In the illustrated embodiment, the second resilient member 63 is a helical, compression spring. Opposite ends of the second resilient member 63 resist the pushing member 61 and a bottom wall of the blind mounting slot 311 correspondingly. When no pressure is applied on the second resilient member 63, the pushing member 61 partially protrudes out of the blind mounting slot 311 and into the battery receptacle 30. The pushing portion 61 of the pushing member 60 resists the battery 20 received in the battery receptacle 30 and resisted by the second resilient member 63, thus the battery 20 can be pushed out of the battery receptacle 30 easily when the locking member 50 is unlocked with the battery 20.

Referring to FIG. 1 and FIG. 2, when installing the battery 20 into the battery receptacle 30, the first surface 21 of the battery 20 contacts with the first sidewall 33 of the battery receptacle 30, the locking portion 331 of the first sidewall 33 engages with the first locking slot 211 of the battery 20. The switch portion 57 of the locking member 50 is actuated by a user, so that the first resilient member 59 becomes compressed. The guiding portion 53 slides from the first receiving slot 41 to the second receiving slot 43. The resisting portion 55 engages with the second locking slot 231 of the battery 20. When the battery 20 is pressed, the resisting portion 55 slides in the second locking slot 231. The battery 20 presses the pushing portion 61 of the pushing member 60 and compresses the second resilient member 63, so that the pushing member 60 can be completely received in the blind mounting slot 311. When the switch portion 57 is released, an elastic force created by the first resilient member 59 forces the resisting portion 55 to slide from the second locking slot 231 into the third locking slot 233 of the battery 20 and the battery 20 becomes locked in the battery receptacle 30.

To remove the battery 20 from the battery receptacle 30, the switch portion 57 of the locking member 50 may be pushed, the resisting portion 55 slides from the third locking slot 233 to the second locking slot 231. An elastic force created by the second resilient member 63 forces the pushing portion 61 to lift the battery 20, so that the battery 20 can be removed from the battery receptacle 30.

In the process of pushing the battery 20 out of the battery receptacle 30 by the pushing member 60, the pushing member 60 and the battery 20 do not slide against each other relatively, therefore, little friction is generated between the pushing member 60 and the battery 20. Thus, the battery 20 can be protected from abrading.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A battery holding structure for holding a battery, comprising:
    a battery receptacle comprising a base wall, a first sidewall, and a second sidewall extending perpendicularly from the base wall, and opposite to the first sidewall, the base wall defining a blind mounting slot, the first sidewall extending substantially perpendicularly from the base wall, a locking portion being formed from the first sidewall; the battery defining a first locking slot; the locking portion engaging with the first locking slot;
    a receiving chamber communicating with the battery receptacle, the second sidewall defining the receiving chamber;
    a locking member received in the receiving chamber and partially protruding in the battery receptacle to lock the battery; and
    a pushing member comprising a pushing portion and a first resilient member; wherein when the locking member is locked with the battery, the pushing member is received in the blind mounting slot; and when the locking member is unlocked with the battery, the first resilient member elastically pushes the pushing portion to protrude into the battery receptacle along the blind mounting slot.

2. The battery holding structure of claim 1, wherein the receiving chamber comprises a first receiving slot and second receiving slot communicating with each other.

3. The battery holding structure of claim 1, wherein the locking member comprises a main body and a resisting portion protruding from the main body; the battery defines a second locking slot and a third locking slot communicates with the third locking slot; the resisting portion can slides from the second locking slot into the third locking slot to lock the battery, and slides from the third locking slot to the second locking slot to unlock the battery.

4. The battery holding structure of claim 3, wherein the locking member further comprises a second resilient member, one end of the second resilient member is fixed on the main body of the locking member, the first resilient member forces the resisting portion to slides from the third locking slot to the second locking slot to unlock the battery.

5. The battery holding structure of claim 3, wherein the locking member further comprises a guiding portion protruding from the main body, the guiding portion slides in the receiving chamber.

6. The battery holding structure of claim 3, wherein the second resilient member is a helical, compression spring.

7. The battery holding structure of claim 6, wherein the first resilient member is a helical, compression spring.

8. A battery holding structure for holding a battery, comprising:
    a battery receptacle comprising a base wall, the base wall defining a blind mounting slot;
    a receiving chamber communicating with the battery receptacle;
    a locking member received in the receiving chamber and partially protruding in the battery receptacle to lock the battery, the locking member comprising a main body and a resisting portion protruding from the main body; the battery defining a first locking slot and a second locking slot communicating with the first locking slot, the resisting portion being capable of sliding from the first locking slot into the second locking slot to lock the battery, and sliding from the second locking slot to the first locking slot to unlock the battery; and
    a pushing member comprising a pushing portion and a first resilient member; wherein when the locking member is locked with the battery, the pushing member is received in the blind mounting slot; and when the locking member is unlocked with the battery, the first resilient member elastically pushes the pushing portion to protrude into the battery receptacle along the blind mounting slot.

9. The battery holding structure of claim 8, wherein the locking member further comprises a second resilient member, one end of the second resilient member is fixed on the main body of the locking member, the first resilient member forces the resisting portion to slides from the second locking slot to the first locking slot to unlock the battery.

10. The battery holding structure of claim 8, wherein the locking member further comprises a guiding portion protruding from the main body, the guiding portion slides in the receiving chamber.

11. The battery holding structure of claim 8, wherein the second resilient member is a helical, compression spring.

12. The battery holding structure of claim 11, wherein the first resilient member is a helical, compression spring.

* * * * *